(12) United States Patent
Mirrezaei (10) Patent No.: US 11,942,080 B2
(45) Date of Patent: Mar. 26, 2024

(54) ENHANCED SPOKEN LANGUAGE UNDERSTANDING USING JOINT MODEL TRAINING

(71) Applicant: Walmart Apollo, LLC, Bentonville, AR (US)

(72) Inventor: Seyed Iman Mirrezaei, Pittsburgh, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 330 days.

(21) Appl. No.: 17/163,190

(22) Filed: Jan. 29, 2021

(65) Prior Publication Data

US 2022/0246141 A1 Aug. 4, 2022

(51) Int. Cl.
*G10L 15/18* (2013.01)
*G10L 15/06* (2013.01)
*G10L 15/22* (2006.01)

(52) U.S. Cl.
CPC .......... *G10L 15/1815* (2013.01); *G10L 15/22* (2013.01); *G10L 15/063* (2013.01)

(58) Field of Classification Search
CPC ... G10L 15/1815; G10L 15/22; G10L 15/063; G10L 15/1822; G06F 40/30; G06N 3/08; G06N 5/02
See application file for complete search history.

(56) References Cited

U.S. PATENT DOCUMENTS

| | | | |
|---|---|---|---|
| 6,292,767 B1* | 9/2001 | Jackson | G06F 40/30 704/9 |
| 7,756,710 B2 | 7/2010 | Franco et al. | |
| 8,606,581 B1* | 12/2013 | Quast | G10L 15/32 704/254 |
| 10,121,471 B2 | 11/2018 | Hoffmeister et al. | |
| 11,132,994 B1* | 9/2021 | Zhou | G06F 40/30 |
| 2014/0236570 A1 | 8/2014 | Heck et al. | |
| 2017/0024375 A1 | 1/2017 | Hakkani-Tur et al. | |
| 2017/0372199 A1* | 12/2017 | Hakkani-Tur | G06N 3/044 |
| 2018/0182380 A1* | 6/2018 | Fritz | H04W 4/12 |
| 2018/0341698 A1* | 11/2018 | Wang | G06N 5/02 |

OTHER PUBLICATIONS

Hakkani-Tur, Dilek et al., "Translating Natural Language Utterances to Search Queries for SLU Domain Detection Using Query Click Logs", Speech Labs, Microsoft, Mountain View, CA, Taken from IEEE (978-1-4673-0046-9), 2012, pp.4953-4956.

* cited by examiner

*Primary Examiner* — Michael Colucci
(74) *Attorney, Agent, or Firm* — Morgan, Lewis & Bockius LLP; Manita Rawat (57) ABSTRACT

Systems and methods for improved Spoken Language Understanding ("SLU") are provided. The methods may comprise receiving an utterance from a user, contextualizing a plurality of words in the utterance, providing the contextualized words to the slot detector to determine the probability of a word forming the beginning or end of a slot to determine slots and nested slots, an intent classifier to determine the probability of a word conveying a user intent, and a slot classifier that applies specific labels to each slot and nest slot. The SLU method may employ a model and jointly trains the model for each task (determining beginning and end of slots, intents, and slot classifications) using a combined loss function.

20 Claims, 8 Drawing Sheets

| Word | Add | lingonberry | frozen | okra | biotin | soft | gel |
|---|---|---|---|---|---|---|---|
| PR(begin slot, wi) | 0.01 | 0.4 | 0.5 | 0.7 | 0.7 | 0.9 | 0.7 |
| Pr(end slot, wi) | 0.01 | 0.4 | 0.5 | 0.8 | 0.8 | 0.6 | 0.5 |
| Slot | N/A | Slot_1 | Slot_2 | Slot_3 | Slot_4 | Slot_5 | Slot_6 |
| Nested slot | N/A | | Nested Slot_1 | | Nested Slot_2 | | |
| Slot label | N/A | Product / Query Item 1 | property | product | product | property | type |
| Nested slot label | N/A | | Query Item 2 | | Query Item 3 | | |

Intent = Add to cart = Pr (intent, CLS)

| Word | Add | lingonberry | frozen | okra | biotin | soft | gel |
|---|---|---|---|---|---|---|---|
| PR(begin slot, wi) | 0.01 | 0.4 | 0.5 | 0.7 | 0.7 | 0.9 | 0.7 |
| Pr(end slot, wi) | 0.01 | 0.4 | 0.5 | 0.8 | 0.8 | 0.6 | 0.5 |
| Slot | N/A | Slot_1 | Slot_2 | Slot_3 | Slot_4 | Slot_5 | Slot_6 |
| Nested slot | N/A | | Nested Slot_1 | | Nested Slot_2 | | |
| Slot label | N/A | Product / Query Item 1 | property | product | product | property | type |
| Nested slot label | N/A | | Query Item 2 | | Query Item 3 | | |

Intent = Add to cart = Pr (intent, CLS)

ENHANCED SPOKEN LANGUAGE UNDERSTANDING USING JOINT MODEL TRAINING

TECHNICAL FIELD

The disclosure relates generally spoken dialogue systems and, more specifically, to enhanced models for spoken language understanding.

BACKGROUND

Spoken language understanding ("SLU") is a vital component in spoken dialogue systems. SLU and spoken dialogue systems aim to identify the intent of the user as expressed in utterances and extract arguments, also known as "slots," associated with the user's intent. Stated differently, SLU aims to enable spoken dialogue systems to understand what a user says in the same way that a human would understand what is said. The use of and need for such systems has increased dramatically in recent years due to the growth of personal, virtual assistants and applications such as automatic customer services, automatic question answering, shopping voice assistants, etc.

SUMMARY

Prior SLU-based systems do not effectively recognize complex human speech. These failures are amplified when user utterances contain multiple similar slots (e.g., product types, brand names) and related slots (e.g., brand names, quantities, other characteristics), leading to SLU system outputs that can ignore and or misidentified the meaning intended by the user. The novel SLU systems and methods described in embodiments herein is able to overcome the shortcomings of prior systems by recognizing intents and multiple consecutive slots, which may contain similar and/or related slots (e.g., time, types, brand, quantity, product, etc.) in the utterances of users. Further, the SLU systems and methods described in embodiments herein appropriately associates attributes (e.g., quantity, number, quality) with entities (e.g., product type and brand) from a user's utterance. This association results in nested slots, providing an efficient and effective semantic parser for SLU systems. Thus, the SLU systems and methods can better respond to a user inquiry and/or intent. The systems and methods described by embodiments herein also result in reduced latency and turnaround time between a user's utterance and a response from an SLU-based spoken dialogue system or customer thereof (e.g., a virtual assistant) because the system and methods and distinguish between multiple, similar entities (slots) and associates the attributes to the correct entities to better understands the precise meaning of a user utterance. Further, the systems and methods described in embodiments herein allow more flexible interactions with users who can provide utterances that more closely resemble normal speech with further error than prior systems.

In accordance with some embodiments a system comprising a computing device is provided. The computing device may be configured to receive an audio data representation of an utterance from a user and detect a plurality of words within the audio data. The computing device may be further configured to contextualize each of the plurality of words and provide each contextualized word of the plurality of words to a slot detector (e.g., slot beginning classifier and slot ending classifier), a slot classifier, and an intent classifier. The computing device may be further configured to determine one or more slots using the slot detector and determine one or more slot classifications of the one or more slots using the slot classifier. The computing device may be further configured to determine an intent using the intent classifier and provide an output based on the determined intent, one or more slots, and one or more slot classifications. The output may be a SLU model. The output may be a user's intent and particular items as interpreted by the SLU model from the user's utterance. In some embodiments, each word is contextually optimized for the slot detector, slot classifier, and intent classifier to which is provided. In some embodiments, the slot classifier may obtain a slot representation by self-attention.

In accordance with some embodiments, a SLU method is provided. The method may comprise receiving an audio data representation of an utterance from a user and detecting a plurality of words within the audio data. The method may further comprise contextualizing each of the plurality of words and providing each contextualized word of the plurality of words to a slot detector (e.g., slot beginning classifier and slot ending classifier), a slot classifier, and an intent classifier. The method may further comprise determining one or more slots using the slot detector and determining one or more slot classifications of the one or more slots using the slot classifier. The method may further comprise determining an intent using the intent classifier and providing an output based on the determined intent, one or more slots, and one or more slot classifications.

In accordance with some embodiments, a non-transitory computer readable medium having instructions stored thereon is provided. The instructions, when executed by at least one processor, may cause a device to perform operations comprising receiving an audio data representation of an utterance from a user and detecting a plurality of words within the audio data. The operations may further comprise contextualizing each of the plurality of words and providing each contextualized word of the plurality of words to a slot detector (e.g., slot beginning classifier and slot ending classifier), a slot classifier, and an intent classifier. The operations may further comprise determining one or more slots using the slot detector and determining one or more slot classifications of the one or more slots using the slot classifier. The operations may further comprise determining an intent using the intent classifier and providing an output based on the determined intent, one or more slots, and one or more slot classifications.

In some embodiments, the computing device, method, and non-transitory computer readable medium may involve the comparison of the determined one or more slots, one or more slot classifications, and the intent to one or more target slots, one or more target slot classifications, and a target intent, respectively, for the received audio data, and further determine a loss function based on the comparison of each of the determined one or more slots, one or more slot classifications, and the intent to the one or more target slots, the one or more target slot classifications, and the target intent.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
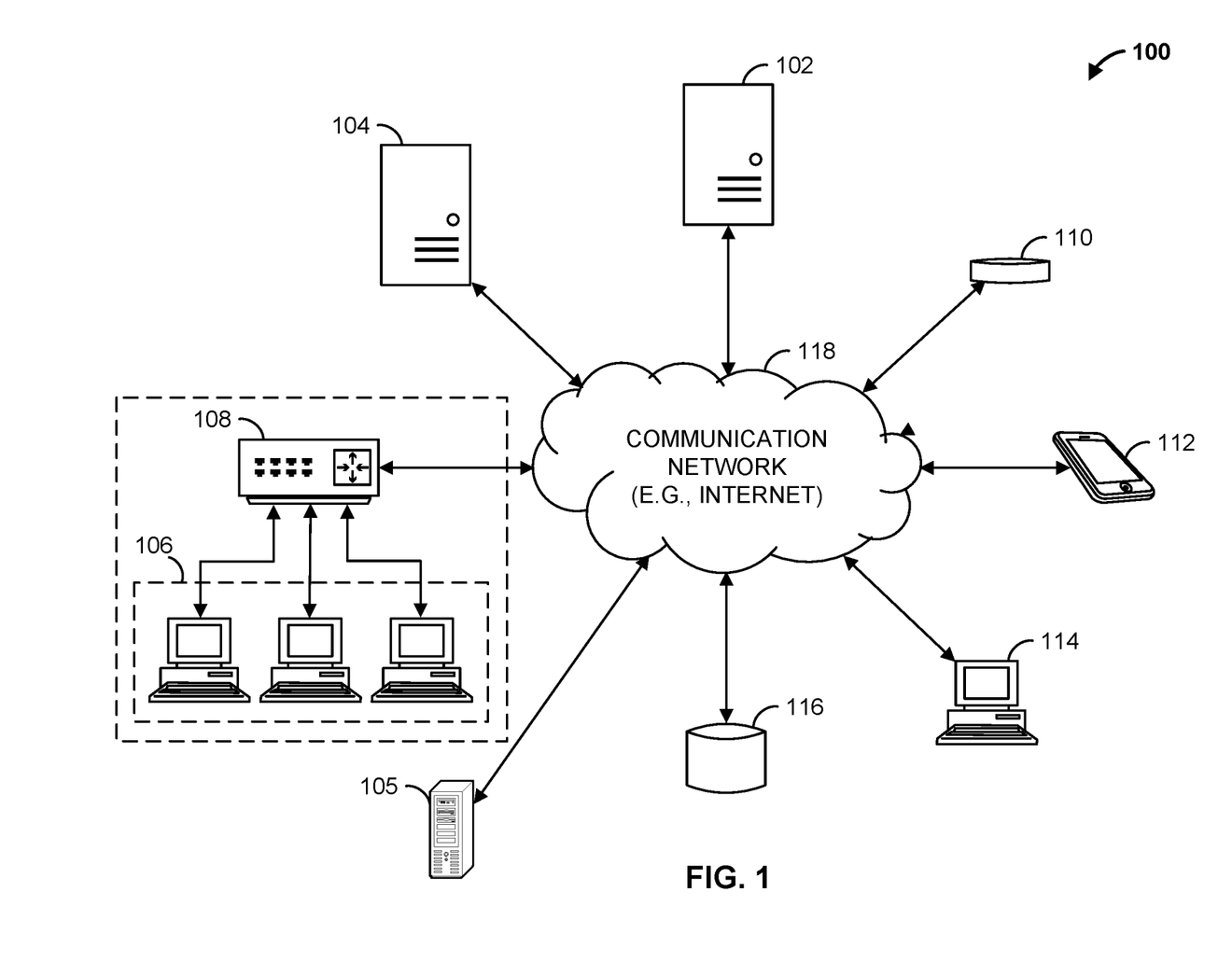
FIG. 1 is a diagram of a spoken dialogue system in accordance with some embodiments.

Turning to the drawings, FIG. 1 illustrates a spoken dialogue system 100 in accordance with some embodiments. System 100 may include SLU-based device 102, a web server 104, workstation(s) 106, database 116, a virtual assistant system 105, and multiple customer computing devices 110, 112, 114, each operatively coupled to one another over network 118 (e.g., the Internet).

SLU-based device 102, workstation(s) 106, server 104, virtual assistant system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, network 118.

In some examples, SLU-based device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, SLU-based device 102, virtual assistant system 105, and web server 104 may be operated by a single organization (e.g., a medical institution, a retailer, etc.), and multiple customer computing devices 112, 114 are operated by customers of the retailer. In some embodiments, virtual assistant system 105 and web server 104 may be consumers of the SLU-based device 102. In some embodiments, virtual assistant 105 by be operated by a customer of the of the organization operating SLU-based device 102.

Although FIG. 1 illustrates three customer computing devices 110, 112, 114, system 100 can include any number of customer computing devices 110, 112, 114. Similarly, spoken dialogue system 100 can include any number of workstation(s) 106, SLU-based devices 102, web servers 104, virtual assistant systems 105, and databases 116.

Workstation(s) 106 is operably coupled to communication network 118 via router (or switch) 108. Workstation(s) 106 can communicate with SLU-based device 102 over communication network 118. The workstation(s) 106 may send data to, and receive data from, SLU device 102. For example, the workstation(s) 106 may transmit audio data representing the utterance of a user to SLU-based device 102 to, for example, train SLU models (which may be subsequently stored in database 116; training data may also be stored in database 116).

In some examples, SLU-based device 102 may transmit, in response to received audio data, an output based on the slot(s), slot classification(s), and intent(s) of the user as detected/determined by the SLU-based device 102. In some examples, the output may be a SLU model used to determine the meaning of subsequent user utterances. In some examples, the output may represent the meaning of the user utterance. For example, the output may be a diagnosis of and/or treatment plan for a patient. As another example, the output may list of items to accomplish and/or items to purchase.

In some examples, web server 104 hosts one or more websites, such as a medical provider's or retailer's website. Medical personnel or customers, via one or more customer computing devices 110, 112, 114, may access the website to input medical diagnosis and/or treatment plans, or purchase various item. The medical personnel and customers may achieve these actions via virtual assistant located on one or more of computing devices 110, 112, 114 and/or located on or through virtual assistant device 105 using utterances. In some examples, web server 104 provides for display a response based on the user's utterance. For example, web server 104 may identify a user utterance and interpret the meaning of it using SLU-based device 102. SLU-based 102 may provide data (e.g., user intent, slots, and slot classification) to the web server 104 for additional action by the web server 104 (e.g., scheduling medical treatment, or adding items to a customer's cart) that is subsequently presented to the user of web server 104.

SLU-based device 102 is operable to communicate with database 116 over communication network 118. For example, SLU-based device 102 can store data to, and read data from, database 116. Database 116 can be a remote storage device, such as a cloud-based server, a disk (e.g., a hard disk), a memory device on another application server, a networked computer, or any other suitable remote storage. Although shown remote to SLU-based device 102, in some examples, database 116 can be a local storage device, such as a hard drive, a non-volatile memory, or a USB stick. In some examples, database 116 stores one or more machine learning models that, when executed by SLU-based device 102, allow SLU-based device 102 to determine one or more intents, slots, and slot classifications from a user's utterance. The machine learning models (e.g., algorithms) may include, for example, Generative Adversarial Networks (GANs), decision tree models, neural networks (e.g., ANNs, CNNs), support vector machines, or any other suitable machine learning models.

Communication network 118 can be a WiFi network, a cellular network, a Bluetooth network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, and may include, for example, the Internet.

SLU-based device 102 is operable to identify intents, slots, and slot classifications within a user's utterance using SLU models, and provide for the training of the same SLU models.

For example, one of the customer computing devices 110, 112, 114 may provide, possibly via web server 104 and/or virtual assistant 105, am utterance to SLU-based system 102. SLU-based system 102 may access a SLU-model from database 116 to identify user intent(s), slot(s), and slot classification(s) from the utterance. The SLU-based system 102 may then provide an output to the one of the customer computing devices 110, 112, 114, possibly via server 104 and/or virtual assistant 105. In some embodiments, work station 106 may be used by the provider of SLU-based system 102 in order to train an SLU model using SLU-based system 102.

Figure 2:
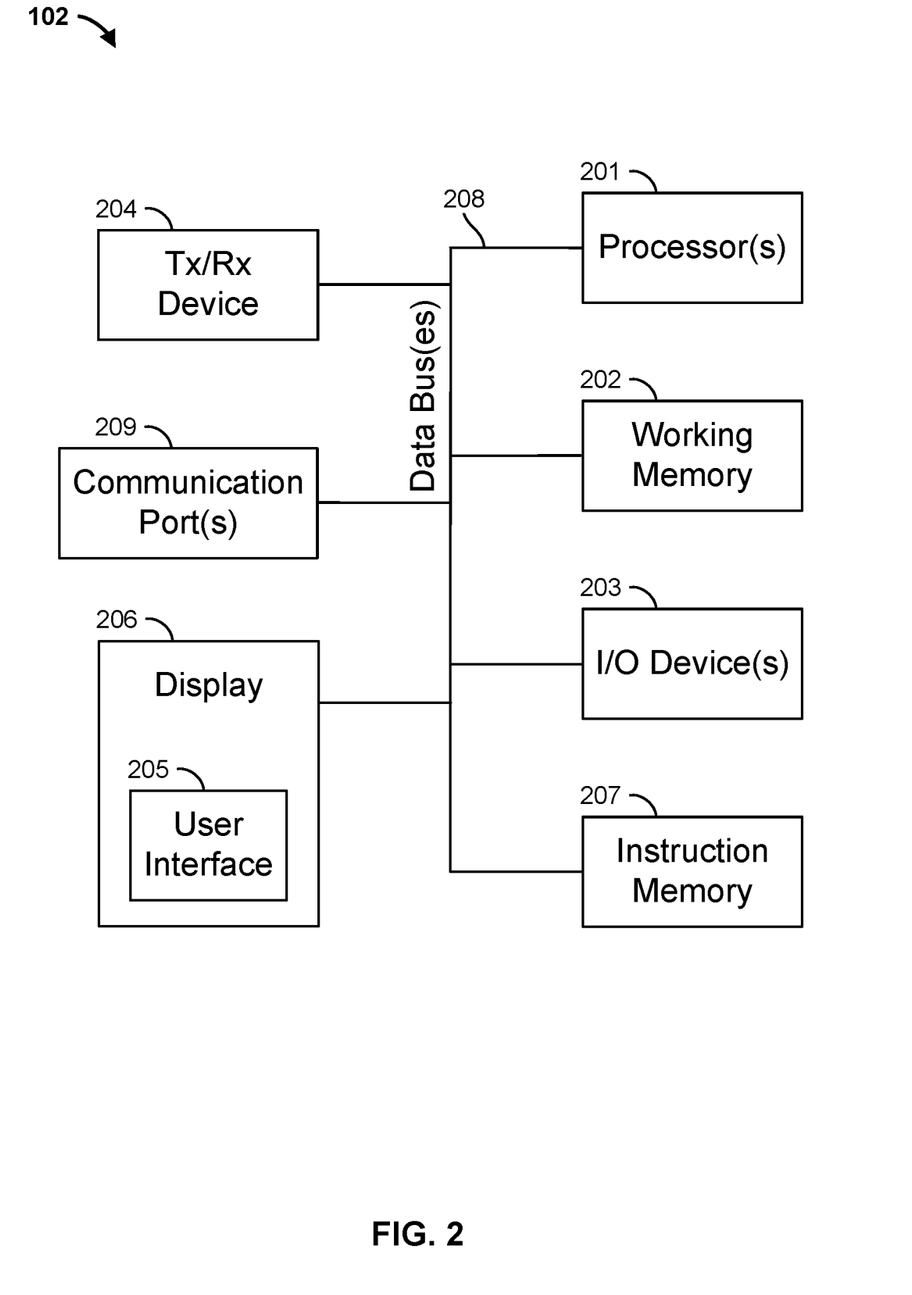
FIG. 2 illustrates a SLU-based device in accordance with some embodiments.

FIG. 2 illustrates the SLU-based device 102 of FIG. 1. SLU-based device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of device 102.

Working memory 202 can be a random-access memory (RAM) such as a static random-access memory (SRAM) or dynamic random-access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data and an SLU model.

Display 206 can display user interface 205. User interfaces 205 can enable user interaction with SLU-based device 102. For example, user interface 205 can be a user interface for an application of machine learning models to be applied to user session data (e.g., user utterances), that may be from web server 104 and/or virtual assistant 105. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 device 102 will be operating in. Processor(s) 201 is operable to receive data from, or send data to, a network, such as communication network 118 of FIG. 1, via transceiver 204.

Figure 3A:
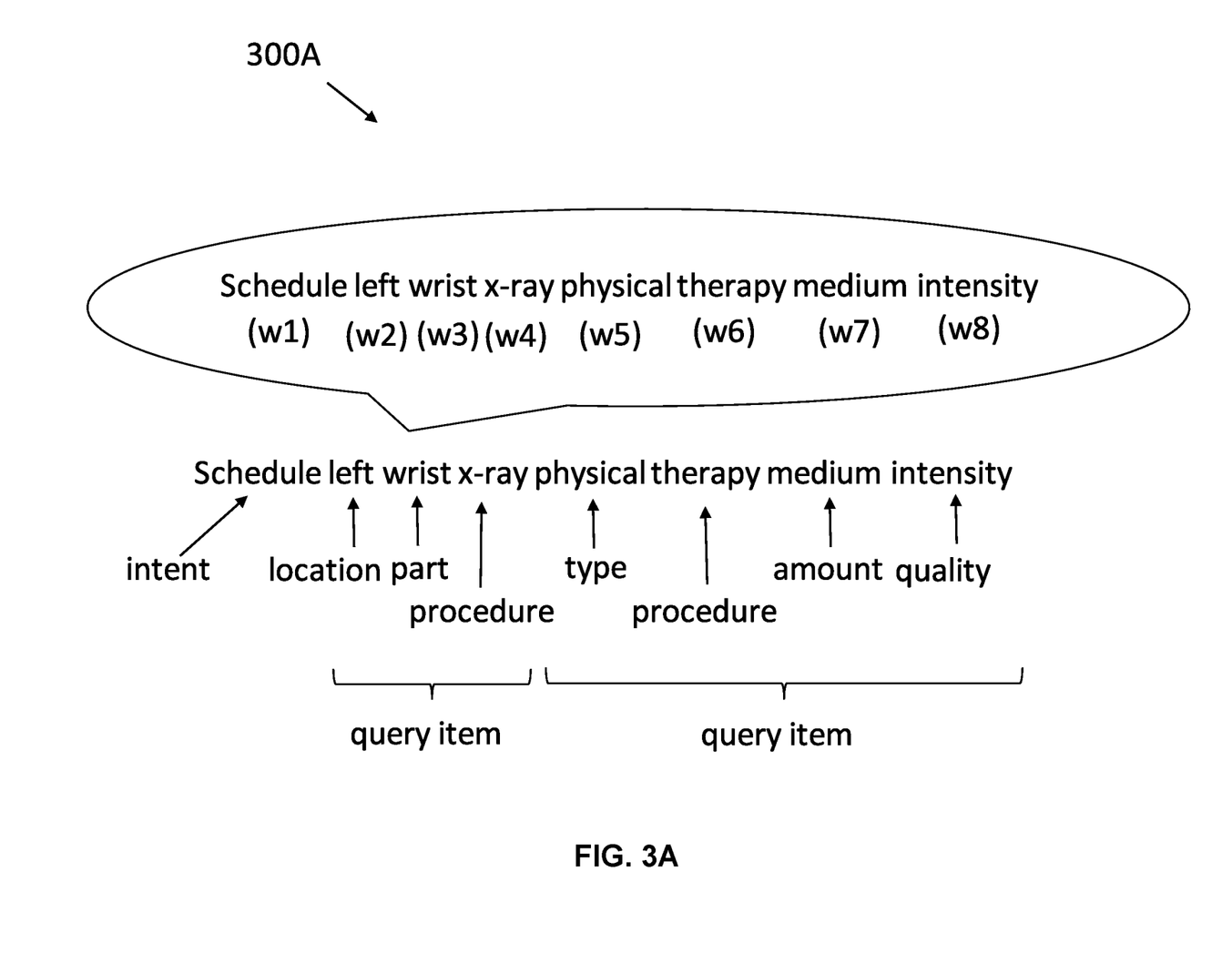
FIGS. 3A-3B are exemplarity user utterances in accordance with some embodiments.
Figure 3B:
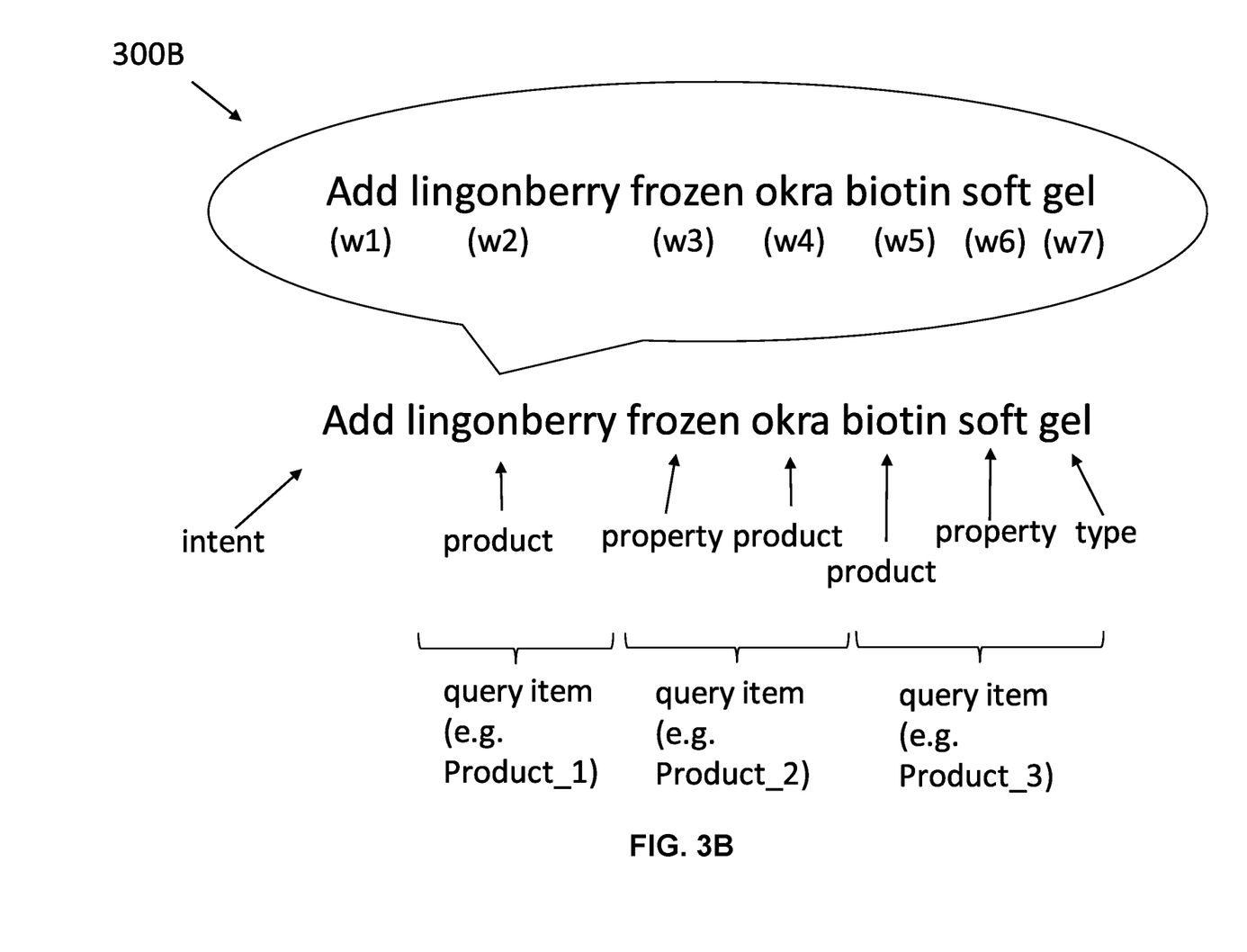

In operation, SLU-based device 102 is used to train, and employ, a SLU model for determining intent(s), slot(s), and slot classifications from a user utterance. Examples of such utterances are illustrated in FIGS. 3A-3B. FIG. 3A illustrates the user utterance 300A: "Schedule left wrist x-ray and physical therapy medium intensity" which comprises a series of words (w1, w2 . . . wn) that are meant to convey a particular meaning to user. While, a person can readily interpret that the speaker of this utterance intends to schedule (w1) both an x-ray of the left wrist (w2-w4) and physical therapy of medium intensity (w6-w9), prior SLU systems exhibit difficulty in identifying multiple similar slots and classifications of these slots, resulting in an incorrect output (e.g., scheduling the wrong or an unidentified type of x-ray or physical therapy) or in simply ignore some portion of the user utterance.

The systems and methods described herein allow the identification of the slots (e.g., "left", "wrist", "x-ray", "physical", "therapy", "medium", "intensity") and nested slots ("left wrist x-ray" and "physical therapy medium intensity") and intent ("schedule") within this utterance.

FIG. 3B provides another example of a user utterance 300B: "Add lingonberry frozen okra biotin soft gel." This utterance consists of a series of words (w1, w2 . . . wn), conveying the user's intent to add (w1) three items (lingonberry (w2), frozen okra (w3-w4), and biotin soft gel (w5-w7)) to a user's cart. A person intuitively understands the various interrelationships of these words with one another and can readily identifies the three particular items listed above. This understanding can be considered a classification of intent ("add"), slots ("lingonberry", "frozen", "okra", "biotin", "soft", "gel") and nested slots ("frozen okra" and "biotin soft gel"), and slot labels ("lingonberry", ("frozen okra" and "biotin soft gel") containing related arguments that identify particular products. Again, prior SLU systems exhibit difficulty in identifying these three particular items from user utterances.

Figure 4:
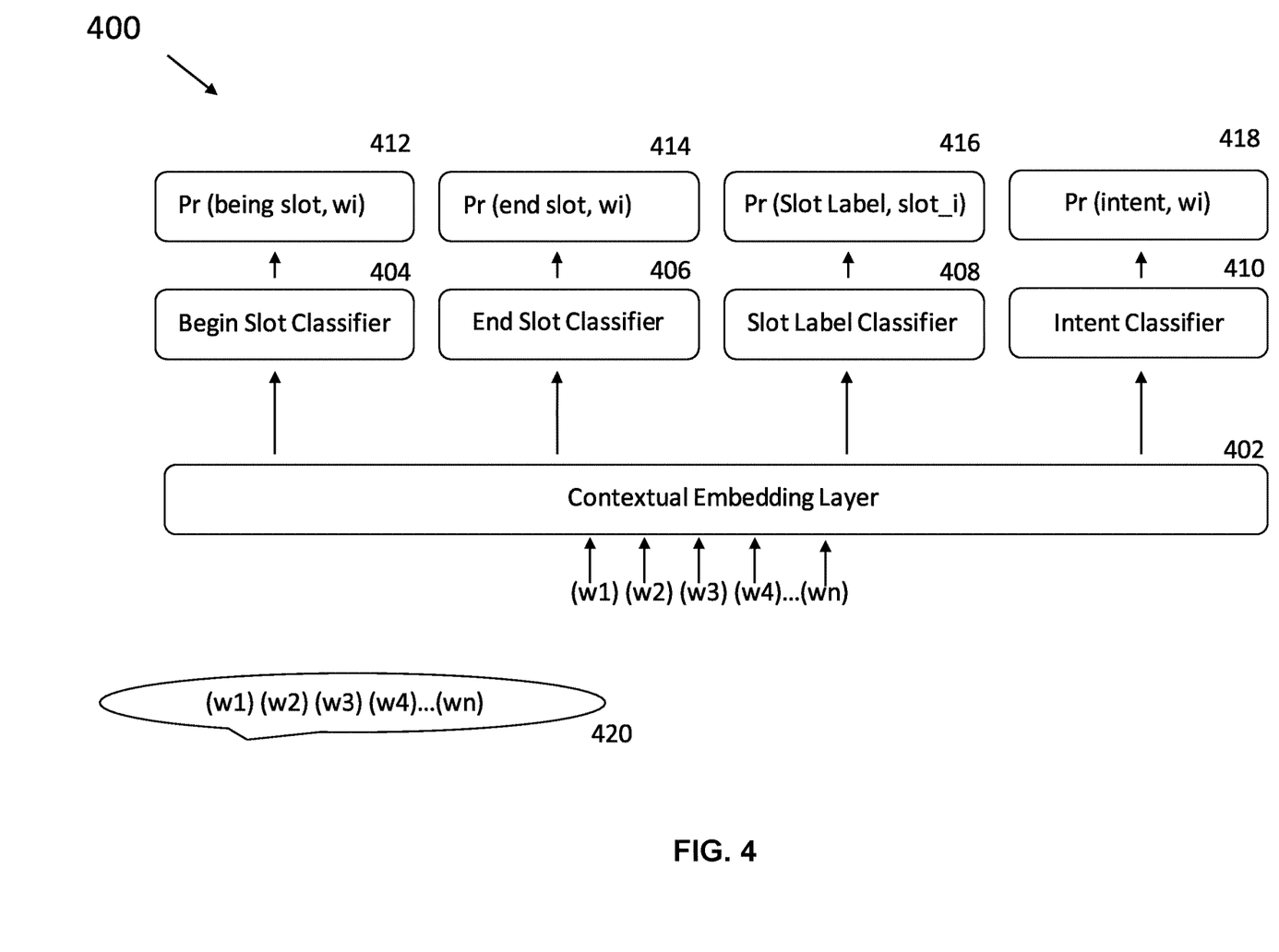
FIG. 4 is a diagram of a multi-entity model in accordance with some embodiments.

The SLU-based device 102 overcomes these shortcomings of prior SLU systems by employing a multi-entity training resulting in superior model for detecting intent(s), slot(s), and slot label classification(s) from user utterances. A diagram of a multi-entity model 400 in accordance with some embodiments is illustrated in FIG. 4. The model consists of a contextual embedding layer 402, a Begin-Slot Classifier 404, an End-Slot Classifier 406, a Slot Label Classifier 408, and an Intent Classifier 410. The model processes a user utterance, e.g., utterance 420 that consists of a series of words (w1, w2 . . . wn). This utterance may be received as audio data that represents the user utterances. The series of words are detected, and the words are contextualized by the contextual embedding layer 402. Contextualization is the process of transforming a word in a vector that represents the particular meaning of that word. Of course, a given word can have multiple meanings that a person can more readily determine based on the context in which the word is used. Each of these various means would be represented by a different vector. In some embodiments, the contextual embedding layer 402 may optimize the contextualization of each word for each of the four tasks performed by the model 400 (i.e., the beginning and end slot classification, the slot label classification, and intent classification, described below). The contextualized words are then each provided to each of the four tasks.

The beginning and end slot classifiers 404 and 406 determine the probability of a particular word forming the begging or end (412, 414), respectively, of a slot. These probabilities allow the identification of likely slots (which may form a nested slot comprising multiple, related slots) that are then provided to the slot classifier 408. Model 400 may also determine an entity-type (e.g., type of procedure, type of food, equipment manufacturer, product brand of product, quantity, characteristic or quality etc.) associated with words in the user utterance and provide it to the slot classifier 408.

This information (slots, nested slots) may be used by the slot classifier 408 to obtain a slot representation of the slot (or nest slot) using self-attention (e.g., transformer blocks); or, statedly different, determine the unique label to apply to a slot (or nested slot) to identify the particular item to which the user intent applies. The transformer block provides a means of processing data in a way that does not necessarily require sequential processing (e.g., w1 then w2, etc.). For example, the self-attention mechanism of a transformer block allows the inputs (the individual words) to interact with each other and find which of the words should be primary and which of the other words likely modify the primary word(s). This allows the SLU model and SLU-based system 102 to better determine the specific items intended to be identified by a user utterance (e.g., a type of x-ray and location to take the same) even if the arguments within a nested slot do not appear in a pre-determined order. As another example, brands, types, and quantities (each of which comprise a type of slot), may be associated with a product (another slot), forming a nested slot that particularly identifies a specific product (e.g., 1 gallon of Great Value 2% milk) that may be identities with a particular SKU that can be added to a user's cart. Given the particular slot (or nested slot) as determined by the beginning and slot classifiers 404, 406, the slot classifier 408 determines the probability 416 that the identified slot (or nested slot) is as intended and selects the best choice based on this probability. Negative sampling methods may also be used in order to decrease overlapping slots that may cause false-positive errors in nested slots that are detected by the slot classifier.

The intent classifier 410 processes the contextualized words to determine the probability 418 that each represents an intent (e.g., to schedule or to add to cart) related to the associated arguments (slots and nested slots).

Model 400 determines the best probability outcome of the four combined tasks and provides and output based on the determined intent, slot, and slot classifier to customer computing devices 110, 112, 114, server 104, and/or virtual assistant 105 to provide a response that better interprets the meaning intended to be conveyed by the user utterance.

Figure 5:
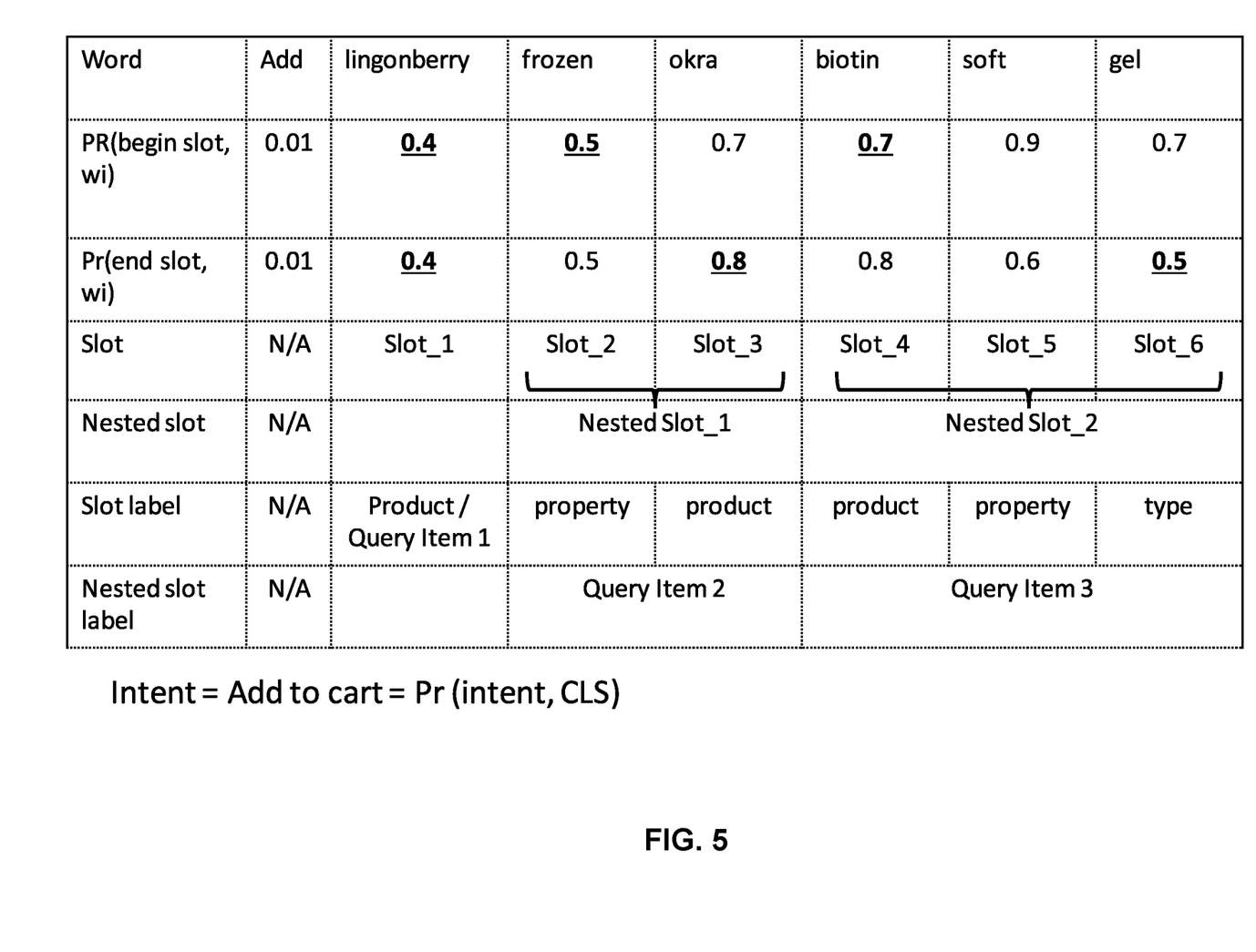
FIG. 5 is an example of determining the intent(s), slots, and slot classifications using the model of FIG. 4 and the user utterance of FIG. 3B.

To provide a better understanding of the operation of model 400, FIG. 5 illustrates an example 500 of determining the intent(s), slots, and slot classifications using the model 400 of FIG. 4 and the user utterance of FIG. 3B in accordance with some embodiments. For example, a user may utter "Add lingonberry frozen okra biotin soft gel" into computing devices 110, 112, or 114, which provides the utterance to SLU-based device 102, possibly via server 104 and/or virtual assistant 105. SLU-based device 102 receives the utterance as an audio data representation of the same and detects a plurality of words in the utterance. Each word is contextualized by the contextual embedding layer 402 as described above. Each contextualized word is then provided to the slot detectors (i.e., the beginning and end slot classifiers 404 and 406). The beginning and end slot classifiers 404 and 406 determine the probability of each word being the beginning or end of a slot, respectively. For example, "lingonberry," "frozen," and "biotin" are determined to have a probability of 0.4, 0.5, and 0.7, respectively, of beginning a slot. Likewise, "lingonberry", "okra", and "gel" are determined to have a probability of 0.4, 0.8, and 0.5, respectively, of ending a slot. The best (i.e., highest) probabilities of word beginning and end a slot are used to determine boundaries between slots (and nested slots) even among multiple, similar arguments. As shown, these slot boundaries result in Slot_1 being determined to include "lingonberry", and Nested Slot_1 including "frozen okra", and Nested Slot_2 including "biotin soft gel." The slot classifier obtains a representation of each slot (e.g., Slot_1) and nested slot (e.g., Nested Slot_2) via self-attention (e.g., transformer blocks) to return the most probable semantic type (e.g., product, brand, etc.), allowing the identification of specific items (i.e., queried items 1, 2 and 3).

Model 400 also determines the probability of the words of the utterance conveying an intent. Model 400 uses CLS that is an embedding of the entire utterance to determine the intent. Here, model 400 determines that the user intends to add items 1, 2, and 3 (as shown in FIG. 5).

Model 400 running on SLU-based device 102 then provides an output of the user's intention to add items 1, 2 and 3 to the user's cart, and provides this output to the user directly and/or via server 104 and/or assistant 105. In some embodiments server 104 or 105 may further process this output for a subsequent response to the user utterance.

Figure 6:
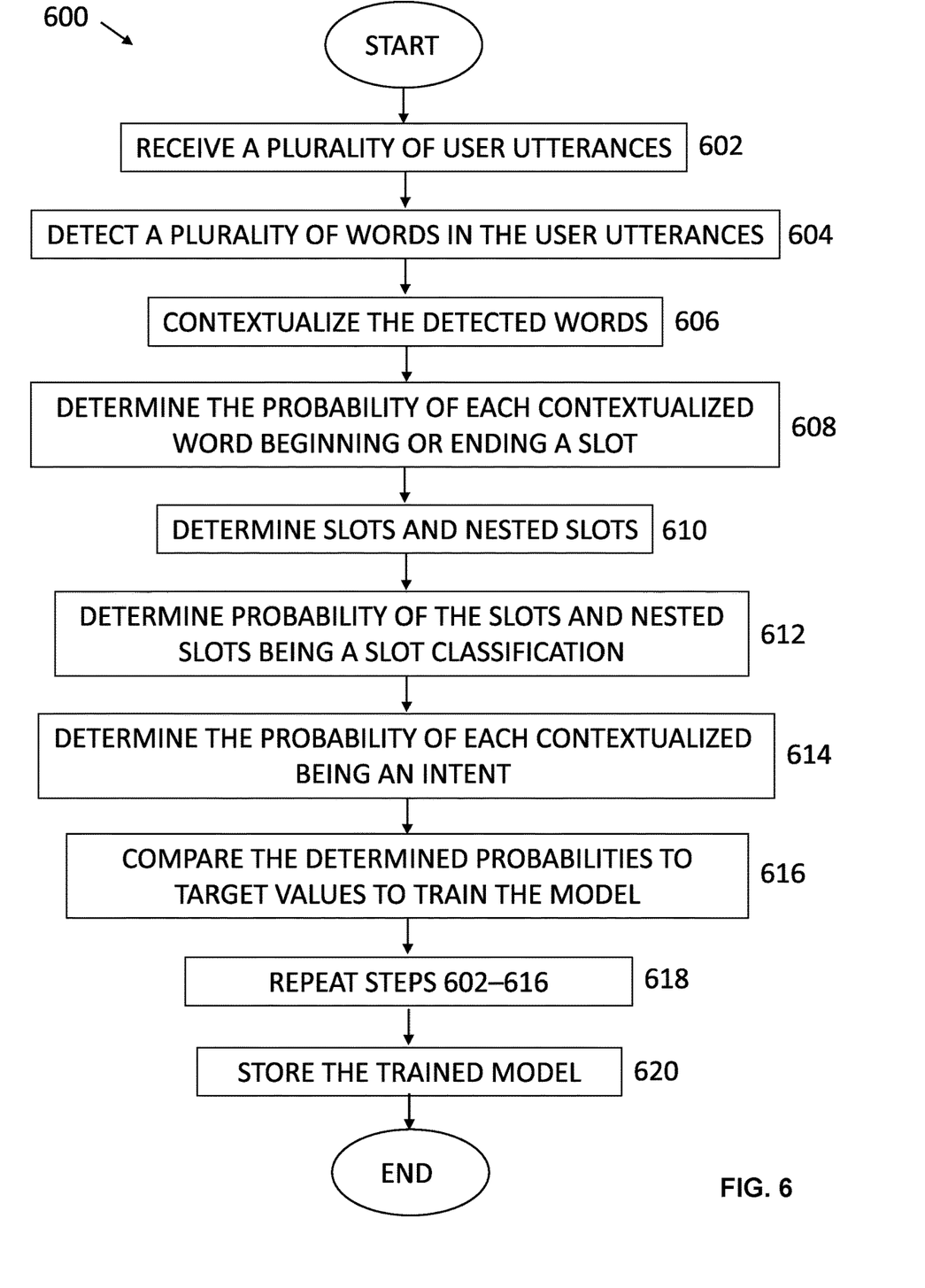
FIG. 6 is flow diagram of a method for multi-entity training in accordance with some embodiments.

Model 400 may be trained to populate database 116 with the probabilities of given contextualized words being the beginning or end of slots, the types of entities to which a word may belong, the probability of a word being an intent, probability of a particular slot label being that intended. FIG. 6 is flow diagram of a method 600 for multi-entity training in accordance with some embodiments. The method starts by receiving a plurality of user utterances at 602. These may be utterances like those illustrated in FIGS. 3A-3B. Furthermore, whether each word of the utterance is the beginning or end of a slot, an intent, part of a single argument slot or a nest slot comprised of multiple similar, related entity types, and the classification of the slot is already known and forms a target to which the model 400 is trained. At 604-606, the model detects a plurality of words in each utterance and contextualizes the detected words as described above. The begin slot classifier and end slot classifier determine the probability of the contextualized words begin the beginning or ending of a slot at 608. At 610, these detected beginning and ending probabilities are utilized to determine the single-argument slots and nested slots. The slot classifier aggregates the argument(s) of each slot for a multi-entity type classification where slot representation (e.g., assigning of a slot label) is obtained by self-attention (using, e.g., transformer blocks), and assigns a probability to the slot label at 612. At 614, the probability of each contextualized word being an intent is also determined. After the probability of a word being the beginning or ending of a slot, and intent, and the slot label for the slots (nested slots) is determined, these values are compared to target values in a feedback mechanism used to train the model at 616. At block 618, blocks 602-616 may be repeated for additional user utterances until a satisfactory model is developed. The model is stored at 620 in, e.g., database 116.

Training of the model is further enhanced by utilizing four-loss function to jointly train each task (slot beginning and end detection classification, slot label classification, and intent classification). The loss function represents the accuracy with which the model can determine a user's intent for the particular items (slots) associate therewith. An example of this four-loss function is provided:

$$\text{Total Loss} = \text{Slot\_Start\_loss} + \text{Slot\_End\_loss} + \text{Slot\_Label\_loss} + \text{Intent\_Loss} \quad \text{Eqn.(1)}$$

This four-loss function equation sums the cross-entropy losses of each task (e.g., slot beginning classification, slot ending classification, slot label classification, and intent classification) performed by model 400, outperforms existing models by training each task together and driving for the lowest overall total loss. In some embodiments, this training results in improved accuracy compared to systems that seek to minimize loss by individual tasks.

Figure 7:
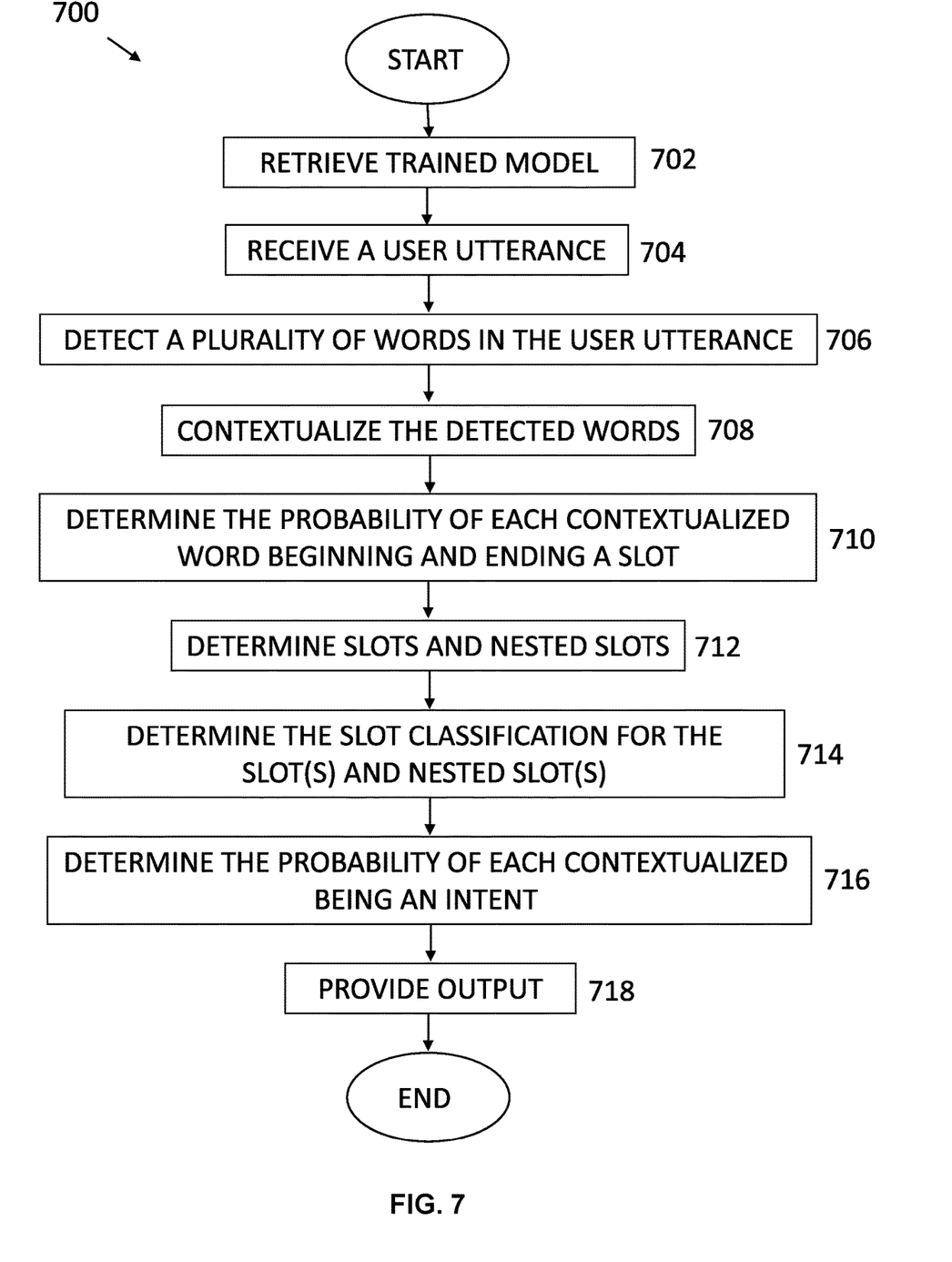
FIG. 7 is a flow diagram of a method for determining the intent(s), slots, and slot classifications using in accordance with some embodiments.

FIG. 7 is a flow diagram of a method 700 for determining the intent(s), slots, and slot classifications using in accordance with some embodiments. Method 700 may be performed by SLU-based device 102. Method 700 starts by retrieving a trained model for SLU at 702. The trained model may be retrieved from database 116. At 704, a user utterance is received. A plurality of words may be detected within the utterance at 706. These words are then contextualized (as described above) at 708. At 710 the probability of each contextualized word forming the begging or end of a slot is determined by the model. These probabilities are used to define the boundaries between slots and nested slots at 712. At block 714, each slot(s) and nested slot(s) is classified by the slot classifier to determine the final representation of the slot. The probability of each contextualized word of being an intent is determined at 716. The resulting output at 718 is the SLU model's understanding of the user's intent and the particular items within the slots (and nested slots) as determined by any associated arguments (slots that further define an entity of the nested slot). This output may be provided directly to a consumer device, or to a customer of the SLU-based device 102 for further processing prior to presentation of the results to an additional user of e.g., a server 104 and/or virtual assistant 105.

Although the methods described above are with reference to the illustrated flowcharts, it will be appreciated that many other ways of performing the acts associated with the methods can be used. For example, the order of some operations may be changed, and some of the operations described may be optional.

Additionally, while embodiments herein have been described with respect to user utterances, the feature of the disclosed embodiments are applicable to non-verbal inputs, e.g., written language, which likewise may contain multiple slots, entity types, and nested slots. Also, while embodiments have been described with respect to scheduling of medical procedures and consumer shopping, the feature of the described embodiments are widely applicable to any context in which the natural or spoken language requires interpretation by a machine (e.g., retail, health, shopping, customer service, chatbots, voice assistants, calendar planners, etc.).

The embodiments described herein result in better spoken language understanding by spoken dialogue systems, particularly in utterances containing multiple entities of the same type and or similar type in conjunction with user intents. The system and methods described herein result not only in more accurate understanding, but also reduced latency times resulting in improved processor performance. The system and methods detect intents, slots, nested slots, and accurately associates attributes within slots to better determine the particular item to which a user is refers and prepare semantic parsing as well.

Furthermore, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
receive an audio data representation of an utterance from a user;
detect a plurality of words within the utterance based on the audio data representation;
contextualize each of the plurality of words;
provide each contextualized word of the plurality of words to a slot detector, a slot classifier, and an intent classifier;
determine one or more slots in the utterance using the slot detector, each slot being a portion of the utterance, wherein the one or more slots are determined based on:
determining a first probability of each contextualized word in the utterance being a beginning word of a slot,
determining a second probability of each contextualized word in the utterance being an end word of a slot, and
determining word boundaries of the one or more slots in the utterance based on all of the first probabilities and the second probabilities,
wherein the word boundaries divide the utterance into the one or more slots;
determine one or more slot classifications of the one or more slots using the slot classifier;
determine an intent using the intent classifier; and
provide an output based on the determined intent, one or more slots, and one or more slot classifications.

2. The system of claim 1, wherein the computing device is further configured to compare the determined one or more slots, one or more slot classifications, and the intent to one or more target slots, one or more target slot classifications, and a target intent, respectively, for the received audio data.

3. The system of claim 2, wherein the computing device is further configured to determine a loss function based on a comparison of each of the determined one or more slots, one or more slot classifications, and the intent to the one or more target slots, the one or more target slot classifications, and the target intent.

4. The system of claim 1, wherein the output is a spoken language understanding model.

5. The system of claim 1, wherein the process of contextualizing the plurality of words comprises optimizing the contextualization of each of the plurality of words for each of the slot detector, the slot classifier, and the intent classifier, and providing each of the contextually optimized words to the respective slot detector, slot classifier, or intent classifier for which each contextualized word was optimized.

6. The system of claim 1, wherein the computing device is further configured to determine one or more nested slots from the one or more determined slots.

7. The system of claim 1, wherein the computing device is further configured to determine the slot classifications by obtaining a slot representation by self-attention.

8. A method comprising:
receiving an audio data representation of an utterance from a user;
detecting a plurality of words within the utterance based on the audio data representation;
contextualizing each of the plurality of words;
providing each contextualized word of the plurality of words to a slot detector, a slot classifier, and an intent classifier;
determining one or more slots in the utterance using the slot detector, each slot being a portion of the utterance, wherein the one or more slots are determined based on:
determining a first probability of each contextualized word in the utterance being a beginning word of a slot,
determining a second probability of each contextualized word in the utterance being an end word of a slot, and
determining word boundaries of the one or more slots in the utterance based on all of the first probabilities and the second probabilities, wherein the word boundaries divide the utterance into the one or more slots;
determining one or more slot classifications of the one or more slots using the slot classifier;
determining an intent using the intent classifier; and
providing an output based on the determined intent, one or more slots, and one or more slot classifications.

9. The method of claim 8, further comprising comparing the determined one or more slots, one or more slot classifications, and the intent to one or more target slots, one or more target slot classifications, and a target intent, respectively, for the received audio data.

10. The method of claim 9, further comprising determining a loss function based on the comparison of each of the determined one or more slots, one or more slot classifications, and the intent to the one or more target slots, the one or more target slot classifications, and the target intent.

11. The method of claim 8, wherein the output is a spoken language understanding model.

12. The method of claim 8, further comprising optimizing the contextualization of each of the plurality of words for each of the slot detector, the slot classifier, and the intent classifier, and providing each of the contextually optimized words to each of the respective slot detector, slot classifier, or intent classifier for which each contextualized word was optimized.

13. The method of claim 8, further comprising determining one or more nested slots from the one or more determined slots.

14. The method of claim 8, wherein determining the slot classifications comprises obtaining a slot representation by self-attention.

15. A non-transitory computer readable medium having instructions stored thereon, wherein the instructions, when executed by at least one processor, cause a device to perform operations comprising:
receiving an audio data representation of an utterance from a user;
detecting a plurality of words within the utterance based on the audio data representation;
contextualizing each of the plurality of words;
providing each contextualized word of the plurality of words to a slot detector, a slot classifier, and an intent classifier;
determining one or more slots in the utterance using the slot detector, each slot being a portion of the utterance, wherein the one or more slots are determined based on:
determining a first probability of each contextualized word in the utterance being a beginning word of a slot,
determining a second probability of each contextualized word in the utterance being an end word of a slot, and
determining word boundaries of the one or more slots in the utterance based on all of the first probabilities and the second probabilities, wherein the word boundaries divide the utterance into the one or more slots;

determining one or more slot classifications of the one or more slots using the slot classifier;

determining an intent using the intent classifier; and providing an output based on the determined intent, one or more slots, and one or more slot classifications.

16. The non-transitory computer readable medium of claim 15, further comprising instructions stored thereon that, when executed by at least one processor, further cause the device to perform operations comprising comparing the determined one or more slots, one or more slot classifications, and the intent to one or more target slots, one or more target slot classifications, and a target intent, respectively, for the received audio data.

17. The non-transitory computer readable medium of claim 16, further comprising instructions stored thereon that, when executed by at least one processor, further cause the device to perform operations comprising determining a loss function based on the comparison of each of the determined one or more slots, one or more slot classifications, and the intent to the one or more target slots, the one or more target slot classifications, and the target intent.

18. The non-transitory computer readable medium of claim 15, further comprising instructions stored thereon that, when executed by at least one processor, further cause the device to perform operations comprising optimizing the contextualization of each of the plurality of words for each of the slot detector, the slot classifier, and the intent classifier, and providing each of the contextually optimized words to each of the respective the slot detector, the slot classifier, or the intent classifier for which each contextualized word was optimized.

19. The non-transitory computer readable medium of claim 15, further comprising instructions stored thereon that, when executed by at least one processor, further cause the device to perform operations comprising determining one or more nested slots from the one or more determined slots.

20. The non-transitory computer readable medium of claim 15, further comprising instructions stored thereon that, when executed by at least one processor, further cause the device to perform operations comprising obtaining a slot representation by self-attention.

* * * * *